US005584099A

United States Patent [19]

Westerdale

[11] Patent Number: 5,584,099

[45] Date of Patent: Dec. 17, 1996

[54] ADJUSTABLE GOOSENECK HINGE

[75] Inventor: David L. Westerdale, Monroe, Mich.

[73] Assignee: Midway Products Group, Inc., Monroe, Mich.

[21] Appl. No.: 518,234

[22] Filed: Aug. 23, 1995

[51] Int. Cl.$^{6}$ .................................................... B62D 25/10

[52] U.S. Cl. ................................ 16/245; 16/235; 16/308; 296/76

[58] Field of Search ............................. 16/224, 235, 238, 16/245, 246, 298, 306, 308, 358, 360, 361; 296/76; 180/69.21

[56] References Cited

U.S. PATENT DOCUMENTS

| | | |
|---|---|---|
| 4,893,863 | 1/1990 | Skonieczny et al. . |
| 5,029,930 | 7/1991 | Ihrke et al. . |
| 5,074,609 | 12/1991 | Dear . |
| 5,158,333 | 10/1992 | Saville . |
| 5,365,639 | 11/1994 | Lewkoski . |

*Primary Examiner*—M. Rachuba

*Assistant Examiner*—Christopher Kirkman

*Attorney, Agent, or Firm*—Brooks & Kushman P.C.

[57] ABSTRACT

An adjustable gooseneck hinge (22) for supporting a vehicle closure member (20) includes an adjuster (60) having an adjuster strap pivotally supported by a pivotal connection (32) on a vehicle body mounted hinge member (26) and including a pin and elongated slot connection (64) that connects a first end (42) of a gooseneck strap (40) with the pivotal connection and the adjuster strap. An adjustable connection (65) of the adjuster (60) adjusts the spacing between the pivotal connection (32) and a curved gooseneck portion (48) of the gooseneck strap (40), that connects the first end thereof with a second end (44) thereof on which the closure member (20) is mounted. A second pin and elongated slot connection (66) is also provided between the adjuster strap (62) and the gooseneck strap first end (42) at a spaced location from the pivotal connection (32). The adjustable connection (65) includes a threaded adjuster member (74) that extends between distal ends (68, 70) of the first gooseneck strap end (42) and the adjuster strap (62), which distal ends (68, 70) are located on the opposite side of the pivotal connection (32) from the second pin and elongated slot connection (66).

12 Claims, 4 Drawing Sheets

ADJUSTABLE GOOSENECK HINGE

TECHNICAL FIELD

This invention relates to an adjustable gooseneck hinge for a vehicle body closure member.

BACKGROUND ART

Vehicle body gooseneck hinges have previously been constructed so as to be adjustable in order to provide the proper positioning of an associated closure member with respect to the adjacent vehicle body surface. Such adjustability has previously been provided by moving the location of the pivotal axis of the gooseneck hinge on the vehicle body such as disclosed by United States Patents: U.S. Pat. No. 4,893,863 Skonieczny et al; U.S. Pat. No. 5,029,930 Ihrke et al; U.S. Pat. No. 5,074,609 Dear; and U.S. Pat. No. 5,158,333 Saville. Also, U.S. Pat. No. 5,365,639 Lawkoski discloses a vehicle body gooseneck hinge having a ball and socket connection which includes adjustability between the center of the ball and the gooseneck member by a threaded connection; however, such ball and socket connections do not have a single axis of rotation so as to be stable and have never found widespread acceptance for usage as part of vehicle body gooseneck hinges.

DISCLOSURE OF INVENTION

An object of the present invention is to provide an improved adjustable gooseneck hinge for supporting a vehicle closure member for movement between open and closed positions with respect to an access opening of a vehicle body.

In carrying out the above object and other objects of the invention, an adjustable gooseneck hinge constructed in accordance with the present invention is operable to support a vehicle closure member for movement between an open position and a closed position with respect to an access opening of a vehicle body. The adjustable gooseneck hinge includes a hinge member for mounting on the vehicle body and including a pivotal connection having a pin that provides a single axis of rotation. A gooseneck strap of the hinge has a first end supported by the pivotal connection of the vehicle body mounted hinge member. A second end of the gooseneck strap supports the closure member at a spaced location from the pivotal connection of the hinge member to the first end. A curved gooseneck portion of the gooseneck strap extends between the first and second ends. An adjuster of the hinge includes a hinge adjuster strap pivotally supported by the pivotal connection of the vehicle body hinge member and a pin and elongated slot connection that connects the first end of the gooseneck strap with both the pivotal connection of the vehicle body mounted hinge member and the adjuster strap. An adjustable connection of the adjuster extends between the adjuster strap and the first end of the gooseneck strap to adjust the spacing between the pivotal connection and the curved gooseneck portion to thereby adjust the position of the closure member adjacent the hinge member in the closed position without moving the location of the pivotal connection with respect to the vehicle body.

In its preferred construction, the adjustable gooseneck hinge includes a second pin and elongated slot connection between the adjuster strap and the first end of the gooseneck strap at a spaced location from the pivotal connection of the vehicle body mounted hinge member. The first end of the gooseneck strap and the adjuster strap each has an associated distal end located on the opposite side of the pivotal connection of the vehicle body mounted hinge member from the second pin and elongated slot connection, and the adjustable connection of the adjuster includes a threaded hole in one of the distal ends and a threaded adjuster member that extends from the other distal end and is received by the threaded hole in the one distal end.

In the preferred construction of the adjustable gooseneck hinge, the distal ends of the first end of the gooseneck strap and the adjuster strap each includes an associated pair of spaced walls, and the distal end of the first end of the gooseneck strap is located between the spaced walls of the adjuster strap. The distal end of the first end of the gooseneck strap preferably includes a nut that extends between the pair of spaced walls thereof and includes the threaded hole of the adjustable connection. The distal end of the adjuster strap includes a distal wall portion, and the threaded member of the adjustable connection extends through the threaded hole of the nut and between the distal end wall portion of the distal end of the adjuster strap and the pivotal connection of the vehicle body mounted hinge member. The pair of spaced walls of the adjuster strap preferably include bent ends that overlap each other and define the distal end wall portion of the distal end of the adjuster strap. These overlapping bent ends of the pair of spaced walls of the adjuster strap have aligned openings, and the threaded member of the adjustable connection of the adjuster has a head including a drive socket that is accessible through these aligned openings. The head of the threaded member also includes an annular flange that engages the distal end wall portion of the adjuster strap.

In the preferred construction, the adjuster strap of the adjustable gooseneck hinge also includes a connection wall that extends between the pair of spaced walls thereof adjacent the second pin and elongated slot connection between the first end of the gooseneck strap and the adjuster strap.

The preferred construction of the adjustable gooseneck hinge also has the vehicle body mounted hinge member provided with a torque rod securement flange for securing one end of a torque rod whose other end cooperates with an associated gooseneck hinge, and the second pin and elongated slot connection of the hinge receives the other end of a like torque rod which thereby provides a pin of the second pin and elongated slot connection. The vehicle body mounted hinge member also includes a bearing notch that receives the one end of the torque rod. The torque rod securement flange of the vehicle body hinge member preferably includes a plurality of securement notches that permit adjustability of the amount of counterbalancing provided to the hinge by the associated torque rod.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
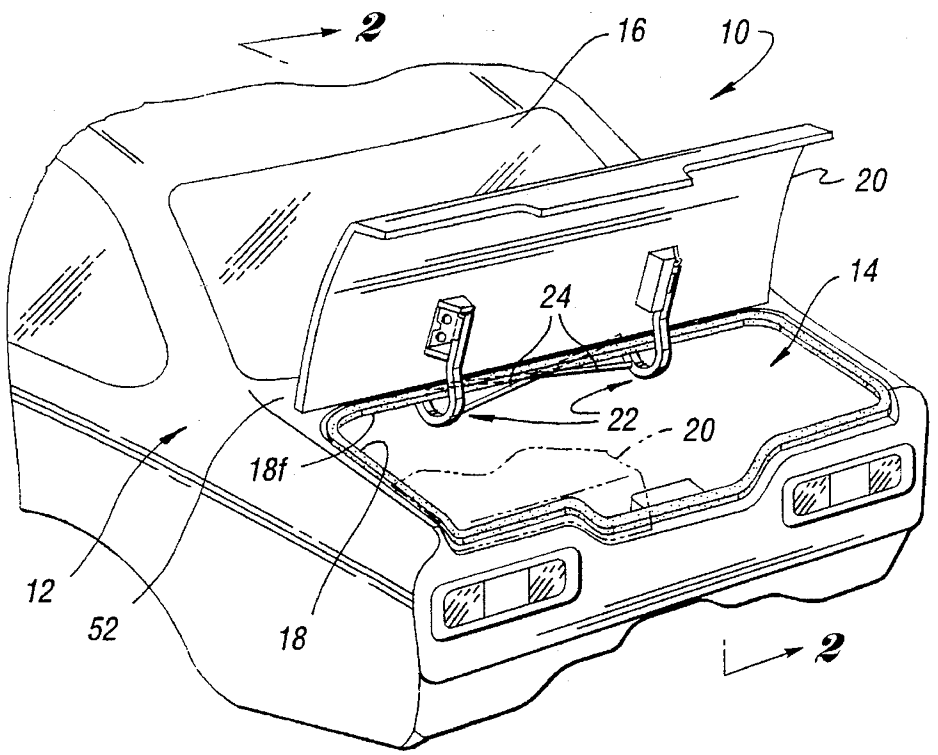
FIG. 1 is a partial perspective view of a vehicle body whose rear storage compartment axis opening is opened and closed by a deck lid closure member that is supported by a pair of adjustable gooseneck hinges each of which is constructed in accordance with the present invention.

With reference to FIG. 1 of the drawings, a vehicle 10 is illustrated as having a vehicle body 12 that includes a rear storage compartment 14 behind the vehicle rear window 16. An access opening 18 of the storage compartment 14 is opened and closed by a closure member 20 of the rear deck lid type which is supported at the front extremity of the opening by a pair of adjustable gooseneck hinges 22 each of which is constructed in accordance with the present invention as is hereinafter more fully described. As is hereinafter more fully described, a pair of torque rods 24 extend between the pair of adjustable gooseneck hinges 22 to provide counterbalancing of the deck lid type closure member 20.

Figure 2:
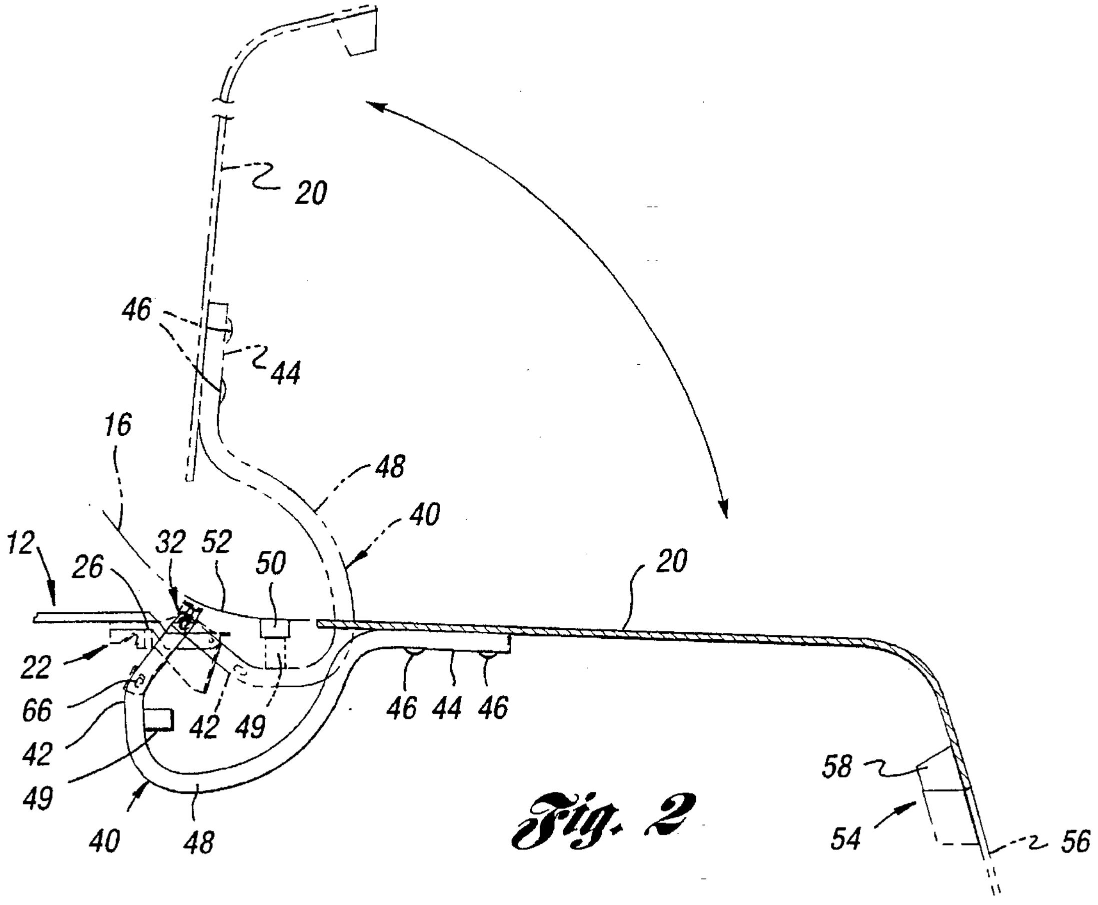
FIG. 2 is a somewhat schematic side elevational view taken in section generally along the direction of line 2—2 of FIG. 1.
Figure 3:
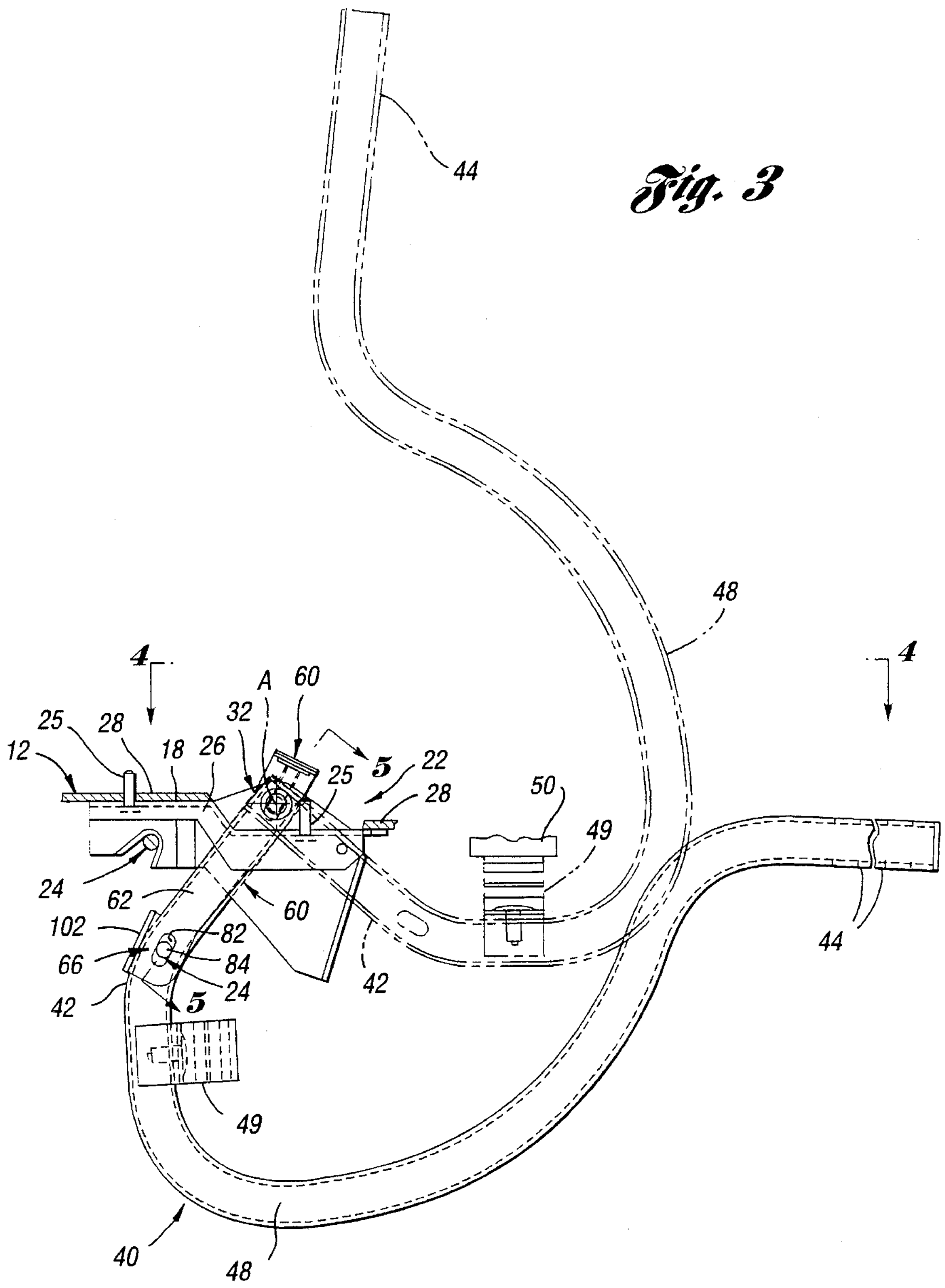
FIG. 3 is a view of the adjustable gooseneck hinge of the invention taken in the same direction as FIG. 2 but at an enlarged scale.
Figure 5:
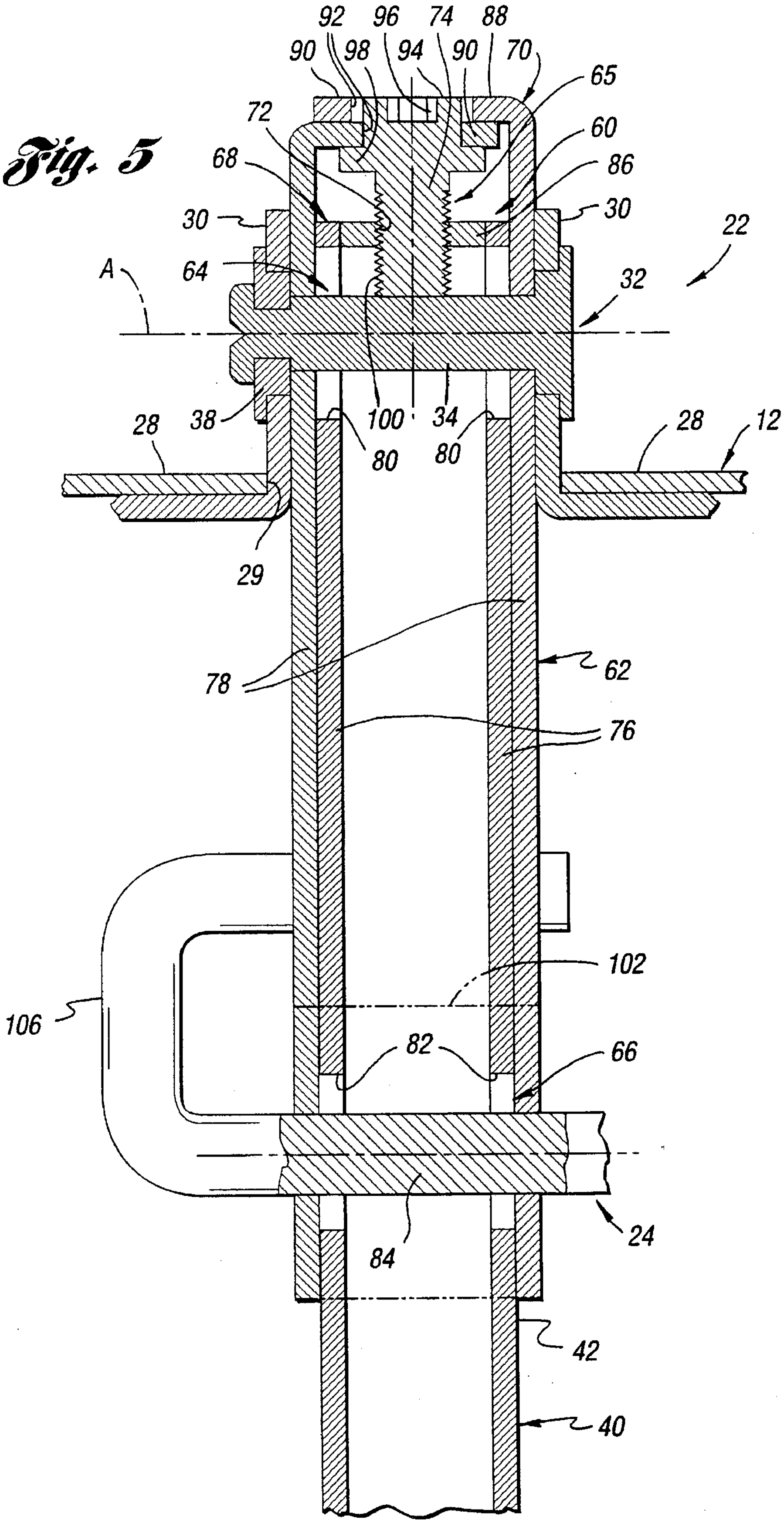
FIG. 5 is a sectional view of the adjustable gooseneck hinge taken along the direction of line 5—5 in FIG. 3.

With combined reference to FIGS. 2 and 3, the adjustable gooseneck hinge 22 of the present invention includes a hinge member 26 that is constructed as a conventional hinge box and is mounted in any conventional manner such as the fasteners 25 on the vehicle body 12 and, as shown, is located adjacent a front extremity 18*f* of the access opening. More specifically, this hinge member 26 is mounted as shown in FIG. 5 on the vehicle body 12 generally below a package tray 28 with the hinge 22 projecting upwardly through a hole 29 in the package tray. More specifically, the hinge member 26 includes a pair of upstanding flanges 30 which extend upwardly through the hole 29 to a location above the package tray 28. A pivotal connection 32 of the hinge member 26 includes a headed pin 34 that extends between the hinge member flanges 30 to provide a single axis A about which the hinge pivoting takes place as is hereinafter more fully described. More specifically, the hinge pin 30 is inserted from the right toward the left so that its head 36 is engaged with the right hinge member flange 30 and its left end is then flanged and secured over a bearing washer 38 to secure the pivotal connection for pivoting about the single axis A in association with the other components of the hinge as are hereinafter more fully described.

As best illustrated in FIGS. 2 and 3, the adjustable gooseneck hinge 22 also includes a gooseneck strap 40 having a first end 42 that is supported by the pivotal connection 32 of the vehicle body mounted hinge member 26. A second end 44 of the gooseneck strap 40 supports the front extremity of the deck lid closure member 20 and is secured thereto by any conventional type of securement such as the fasteners 46 shown. The gooseneck hinge strap 40 also includes a curved gooseneck portion 48 extending between its first and second ends 42 and 44 in an upwardly opening configuration with the hinge in the solid line in the closed position of both FIGS. 2 and 3. Also, a bumper 49 mounted on the gooseneck strap 40 is moveable into engagement with a vehicle body mounted stop 50 upon pivoting of the deck lid closure member 20 from the closed position shown by solid line representation to the open position shown by phantom line representation. This stop 50 is mounted below the vehicle body deck portion 52 situated to the rear of the rear window 16 and just forward of the access opening 18 that is opened and closed by the deck lid closure member 20. In the closed position, a latch mechanism 54 mounted on the rear extremity 56 of the vehicle secures a striker 58 on the deck lid closure member 20 to selectively maintain the closure member in its closed position in a conventional manner while permitting key actuated opening as well as remote actuated opening either by a direct electrical connection to the vehicle occupant compartment or a radio frequency transmitting actuator of the type conventionally now available.

With reference to FIGS. 3–6, the adjustable gooseneck hinge 22 also includes an adjuster 60 including a hinge adjuster strap 62 pivotally supported by the pivotal connection 32 of the vehicle mounted hinge member 26 for pivoting about the pivotal axis A. A first pin and elongated slot connection 64 whose construction is hereinafter more fully described connects the first end 42 of the gooseneck strap 40 with both the pivotal connection 32 of the vehicle body mounted hinge member 26 and the adjuster strap 62. An adjustable connection 65 of the adjuster 60 extends between the adjuster strap 62 and the first end 42 of the gooseneck strap 40 to adjust the spacing between the pivotal connection 32 and the curved gooseneck portion 48. This adjustment adjusts the position of the closure member 20 adjacent the hinge member 26 in the closed position without moving the location of the pivotal connection with respect to the vehicle body. As such, the adjustment provided, with reference to FIG. 2, does not result in any change of the pivotal axis with respect to the latch mechanism 54 so as to change the effective distance therefrom to the hinge pivotal axis after the adjustment in a manner that can adversely affect the closure member positioning adjacent the rear extremity of the vehicle in the closed position.

With combined reference to FIGS. 3 and 5, the adjustable gooseneck hinge 22 also includes a second pin and elongated slot connection 66 between the adjuster strap 62 and the first end 42 of the gooseneck strap 40. This second pin and elongated slot connection 56 is at a spaced location from the pivotal connection 32 of the vehicle body mounted hinge member 26 at axis A. As best shown in FIG. 5, the first end 42 of the gooseneck strap 40 has an associated distal end 68 located on the opposite side of the pivotal connection 32 of the body mounted hinge member 26 from the second pin and elongated slot connection 66. Likewise, the adjuster strap 62 has a distal end 70 that is also located on the opposite side of the pivotal connection 32 of the body mounted hinge member 26 from the second pin and elongated slot connection 66. The adjustable connection 65 of the adjuster 60 as shown in FIG. 5 includes a threaded hole 72 that is located on one of these distal ends, specifically the gooseneck strap distal end 68 as is hereinafter more fully described. Furthermore, the adjustable connection 65 of the adjuster 60 also includes a threaded adjuster member 74 that extends from the other distal end 70 of the adjuster strap 62 and is received by the threaded hole 72 in the one distal end 68. Threaded adjustment of this adjuster member 74 as is hereinafter more fully described provides the adjustment that properly positions the associated closure member with this adjustment being permitted by the sliding action at the first and second pin and elongated slot connections 64 and 66.

With continuing reference to FIG. 5, the gooseneck strap 40 has a generally square tubular cross section such that its first distal end 68 has a pair of spaced walls 76 between which the pivotal connection 32 extends. Furthermore, the adjuster strap 62 also includes a pair of spaced walls 78 between which the distal end 68 of the first end 42 of the gooseneck strap 68 is located. The pin 34 of the pivotal connection 32 extends between the spaced walls 78 of the adjuster strap 60 in a fixed relationship that fixedly locates the location of axis A with respect thereto as well as with respect to the vehicle body mounted hinge member 26. This pin 34 of the pivotal connection 32 also extends through a pair of elongated slots 80 respectively located in the pair of spaced walls 76 of the gooseneck strap first end 42 so as to cooperate therewith in providing the first pin and elongated slot connection 64 as previously described. Likewise, a pair of elongated slots 82 in the pair of spaced walls 76 of the gooseneck strap first end 42 receives a pin 84 that extends between the pair of spaced walls 78 of the adjuster strap 62 through the slots 82 so as to cooperate therewith in providing the second pin and elongated slot connection 66. These pin and elongated slot connections 64 and 66 thus permit longitudinal adjustment between the gooseneck strap first end 42 and the adjuster strap 62 while maintaining the angular orientation therebetween upon pivoting of the gooseneck strap 40 about the pivotal connection 32.

With reference to FIG. 5, the distal end 68 of the first end 42 of gooseneck strap 40 includes a nut 86 that extends between the pair of spaced walls 76 of this distal end and includes the threaded hole 72 through which the threaded adjuster member 74 extends as part of the adjustable connection 65. The distal end 70 of the adjuster strap 62 includes a distal end wall portion 88, and the threaded adjuster member 74 of the adjustable connection 65 extends through the threaded hole 72 of nut 86 and between the distal end wall portion 88 of the distal end 70 of the adjuster strap 60 and the pivotal connection 32 of the vehicle body mounted hinge member 26.

With continuing reference to FIG. 5, the pair of spaced walls 78 of adjuster strap 62 include bent ends 90 that overlap each other and define the distal end wall portion 88 of the adjuster strap. These overlapping bent ends 90 of the pair of spaced walls 78 of the adjuster strap 62 have aligned openings 92. The threaded adjuster member 74 of the adjustable connection 65 of the adjuster 60 has a head 94 including a drive socket 96 that is accessible through the aligned openings 92 to receive a wrench that provides the rotational driving thereof to provide the adjustment as previously described. The head 94 of the threaded adjuster member 74 also includes an annular flange 98 that engages the interior of the distal end wall portion 88 of the adjuster strap 62 between its pair of spaced walls 78. Furthermore, a threaded shank 100 of the threaded adjuster member has an end that engages the pin 34 of the pivotal connection 32. During the threaded rotational adjustment of the adjuster member 74, the end of the threaded shank 100 thus rotates with respect to the pin 34.

Figure 6:
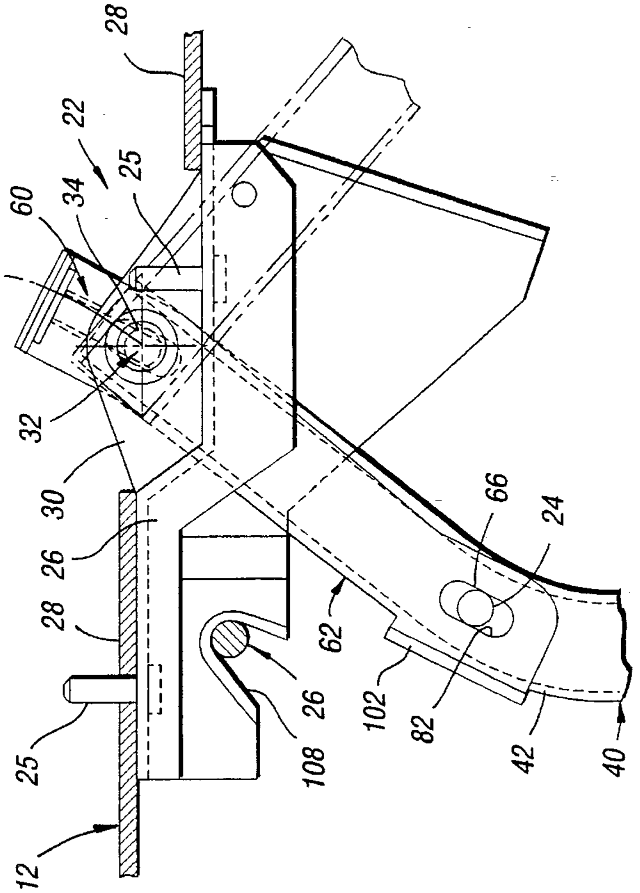
FIG. 6 is a partial enlarged view of FIG. 3 to further illustrate its construction.

With combine reference to FIGS. 3, 5 and 6, the adjuster strap 62 includes a connection wall 102 that extends between the pair of spaced walls 78 thereof adjacent the second pin and elongated slot connection 66.

Figure 4:
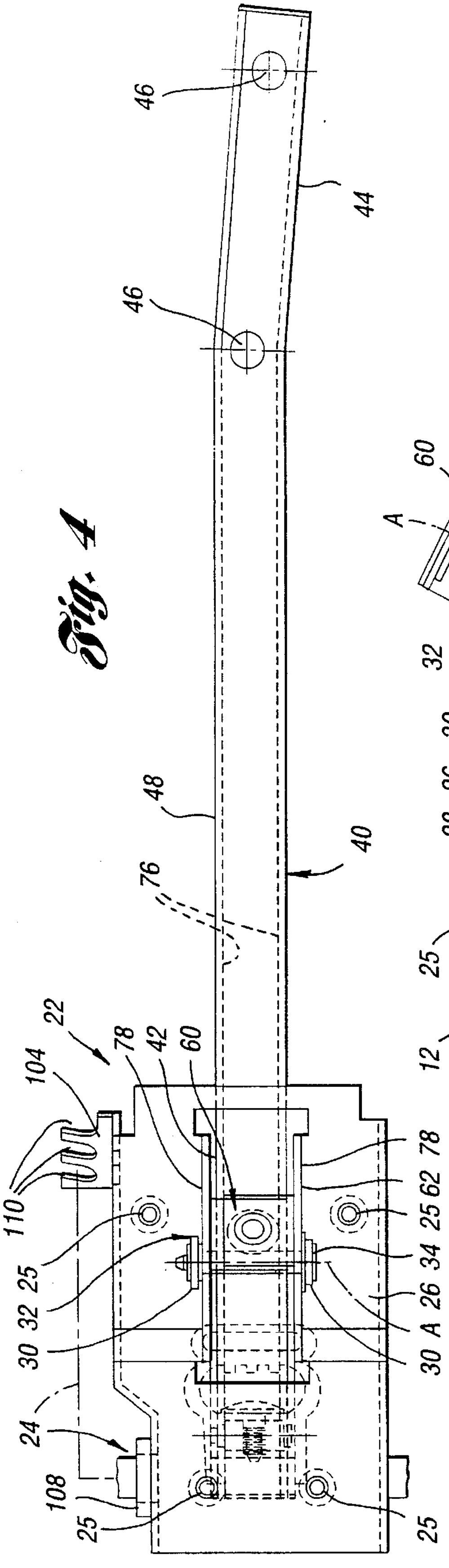
FIG. 4 is a top plan view of the adjustable gooseneck hinge taken along the direction of line 4—4 in FIG. 3.

With reference to FIG. 4, the vehicle body mounted hinge member 26 includes a torque rod securement flange 104 for securing one end of the torque rod 24 whose other end cooperates with the other associated gooseneck hinge 22 as illustrated in FIG. 1. Furthermore, the second pin and elongated slot connection 66 receives the other end of the torque rod 24 from the associated hinge 22 as shown in FIG. 5 to provide the pin 84 of the second pin and elongated slot connection, and this torque rod end is bent in a generally U-shaped configuration 106 to secure the torque rod to the gooseneck strap 40. Furthermore, as illustrated in FIG. 6, the vehicle body mounted hinge member 26 has a bearing notch 108 that receives the adjacent one end of the torque rod 24 from which the torque rod extends as shown in FIG. 4 to the securement flange 104 which preferably includes a plurality of securement notches 110. These securement notches 110 of the securement flange 104 allow the torque rod 24 to be received by the appropriate notch to provide the required amount of counterbalancing needed by the hinge to counterbalance the closure member supported thereby for movement between the open and closed positions previously described.

While the best mode for carrying out the invention has been described in detail, those familiar with the art to which this invention relates will recognize various alternative designs and embodiments for carrying out the invention as described by the following claims.

What is claimed is:

1. An adjustable gooseneck hinge for supporting a vehicle closure member for movement between an open position and a closed position with respect to an access opening of a vehicle body, the adjustable gooseneck hinge comprising:

a hinge member for mounting on the vehicle body and including a pivotal connection having a pin that provides a single axis of rotation;

a gooseneck strap having a first end supported by the pivotal connection of the vehicle body mounted hinge member, a second end for supporting the closure member at a spaced location from the pivotal connection of the hinge member to the first end, and a curved gooseneck portion extending between the first and second ends; and an adjuster including a hinge adjuster strap pivotally supported by the pivotal connection of the vehicle body mounted hinge member, a pin and elongated slot connection that connects the first end of the gooseneck strap with both the pivotal connection of the vehicle body mounted hinge member and the adjuster strap, and an adjustable connection that extends between the adjuster strap and the first end of the gooseneck strap to adjust the spacing between the pivotal connection and the curved gooseneck portion to thereby adjust the position of the closure member adjacent the hinge member in the closed position without moving the location of the pivotal connection with respect to the vehicle body.

2. An adjustable gooseneck hinge as in claim 1 further including a second pin and elongated slot connection between the adjuster strap and the first end of the gooseneck strap at a spaced location from the pivotal connection of the vehicle body mounted hinge member.

3. An adjustable gooseneck hinge as in claim 2 wherein the first end of the gooseneck strap and the adjuster strap each has an associated distal end located on the opposite side of the pivotal connection of the body mounted hinge member from the second pin and elongated slot connection, and the adjustable connection of the adjuster including a threaded hole on one of said distal ends and a threaded adjuster member that extends from the other distal end and is received by the threaded hole in the one distal end.

4. An adjustable gooseneck hinge as in claim 3 wherein the distal ends of the first end of the gooseneck strap and the adjuster strap each includes an associated pair of spaced walls, and the distal end of the first end of the gooseneck strap being located between the spaced walls of the adjuster strap.

5. An adjustable gooseneck hinge as in claim 4 wherein the distal end of the first end of the gooseneck strap includes a nut that extends between the pair of spaced walls thereof and includes the threaded hole of the adjustable connection, the distal end of the adjuster strap including a distal end wall portion, and the threaded adjuster member of the adjustable connection extending through the threaded hole of the nut and between the distal end wall portion of the distal end of the adjuster strap and the pivotal connection of the vehicle body mounted hinge member.

6. An adjustable gooseneck hinge as in claim 5 wherein the pair of spaced walls of the adjuster strap include bent ends that overlap each other and define the distal end wall portion of the distal end of the adjuster strap, the overlapping bent ends of the pair of spaced walls of the adjuster strap having aligned openings, the threaded adjuster member of the adjustable connection of the adjuster having a head including a drive socket that is accessible through said aligned openings, and the head of the threaded adjuster member also including an annular flange that engages the distal end wall portion of the adjuster strap.

7. An adjustable gooseneck hinge as in claim 3 wherein the adjuster strap includes a connection wall that extends between the pair of spaced walls thereof adjacent the second pin and elongated slot connection.

8. An adjustable gooseneck hinge as in claim 3 wherein the vehicle body mounted hinge member includes a torque rod securement flange for securing one end of a torque rod whose other end cooperates with an associated gooseneck hinge, and the second pin and elongated slot connection receiving the other end of a like torque which thereby provides a pin of the second pin and elongated slot connection.

9. An adjustable gooseneck hinge as in claim 8 wherein the vehicle body hinge member also includes a bearing notch that receives the one end of the torque rod.

10. An adjustable gooseneck hinge as in claim 8 wherein the torque rod securement flange of the vehicle body hinge member includes a plurality of securement notches.

11. An adjustable gooseneck hinge for supporting a vehicle deck lid closure member for movement between an open position and a closed position with respect to an access opening of a vehicle body storage compartment, the adjustable gooseneck hinge comprising:

a hinge member for mounting on the vehicle body and including a pivotal connection having a pin that provides a single axis of rotation;

a gooseneck strap having a first end supported by the pivotal connection of the vehicle body mounted hinge member and having a distal end, a second end for supporting the deck lid closure member at a spaced location from the pivotal connection of the hinge member to the first end, and a curved gooseneck portion extending between the first and second ends; and an adjuster including a hinge adjuster strap pivotally supported by the pivotal connection of the vehicle body mounted hinge member, a first pin and elongated slot connection that connects the first end of the gooseneck strap with both the pivotal connection of the vehicle body mounted hinge member and the adjuster strap, a second pin and elongated slot connection between the adjuster strap and the first end of the gooseneck strap at a spaced location from the pivotal connection of the vehicle body mounted hinge member on the opposite side of the pivotal connection from the distal end of the first end of the gooseneck strap, the adjuster strap having an associated distal end located on the opposite side of the pivotal connection of the body mounted hinge member from the second pin and elongated slot connection, and an adjustable connection including a threaded hole on one of said distal ends and a threaded adjuster member that extends from the other distal end and is received by the threaded hole in the one distal end for rotation that adjusts the spacing between the pivotal connection and the curved gooseneck portion to thereby adjust the position of the deck lid closure member adjacent the hinge member in the closed position without moving the location of the pivotal connection with respect to the vehicle body.

12. An adjustable gooseneck hinge for supporting a vehicle deck lid closure member for movement between an open position and a closed position with respect to an access opening of a vehicle body storage compartment, the adjustable gooseneck hinge comprising:

a hinge member for mounting on the vehicle body and including a pivotal connection having a pin that provides a single axis of rotation;

a gooseneck strap having a first end supported by the pivotal connection of the vehicle body mounted hinge member and having a distal end including a pair of spaced walls and a nut that extends therebetween and has a threaded opening, a second end for supporting the deck lid closure member at a spaced location from the pivotal connection of the hinge member to the first end, and a curved gooseneck portion extending between the first and second ends; and an adjuster including a hinge adjuster strap pivotally supported by the pivotal connection of the vehicle body mounted hinge member and including a pair of spaced walls between which the first end of the gooseneck strap is located, a first pin and elongated slot connection that connects the first end of the gooseneck strap with both the pivotal connection of the vehicle body mounted hinge member and the adjuster strap, a second pin and elongated slot connection between the adjuster strap and the first end of the gooseneck strap at a spaced location from the pivotal connection of the vehicle body mounted hinge member on the opposite side of the pivotal connection from the distal end of the first end of the gooseneck strap, the adjuster strap having an associated distal end located on the opposite side of the pivotal connection of the body mounted hinge member from the second pin and elongated slot connection, an adjustable connection including a threaded adjuster member that extends from the distal end of the adjuster strap through the threaded hole in the nut of the distal end of the first end of the gooseneck strap to the pivotal connection, the threaded adjuster member having a head for providing rotation thereof to adjust the spacing between the pivotal connection and the curved gooseneck portion to thereby adjust the position of the deck lid closure member adjacent the hinge member in the closed position without moving the location of the pivotal connection with respect to the vehicle body.

* * * * *